US009593618B2

(12) United States Patent
Runde et al.

(10) Patent No.: US 9,593,618 B2
(45) Date of Patent: Mar. 14, 2017

(54) EXHAUST AFTERTREATMENT SENSOR ASSEMBLY

(71) Applicant: CUMMINS IP, INC., Columbus, IN (US)

(72) Inventors: William J. Runde, Janesville, WI (US); Eric R. Butler, Madison, WI (US); Shashidhar Srinivas, Madison, WI (US); Robert W. Nowicki, Stoughton, WI (US); Shane O'Connor, Cottage Grove, WI (US); Harpreet Patpatia, Stoughton, WI (US); Michael J. Welp, Oregon, WI (US)

(73) Assignee: CUMMINS IP, INC., Columbus, IN (US)

( * ) Notice: Subject to any disclaimer, the term of this patent is extended or adjusted under 35 U.S.C. 154(b) by 291 days.

(21) Appl. No.: 14/317,680

(22) Filed: Jun. 27, 2014

(65) Prior Publication Data
US 2015/0000389 A1 Jan. 1, 2015

Related U.S. Application Data

(60) Provisional application No. 61/840,960, filed on Jun. 28, 2013.

(51) Int. Cl.
*F01N 13/00* (2010.01)
*G01M 15/10* (2006.01)
(Continued)

(52) U.S. Cl.
CPC ........... *F01N 13/008* (2013.01); *F01N 3/021* (2013.01); *F01N 3/2066* (2013.01); (Continued)

(58) Field of Classification Search
CPC .... F01N 13/008; F01N 2260/20; F01N 3/021; F01N 3/2066; F01N 2560/14; G01M 15/102; Y02T 10/24
(Continued)

(56) References Cited

U.S. PATENT DOCUMENTS

| 7,192,463 B2 * | 3/2007 | Shutty | F01N 13/008 174/50 |
| 7,717,205 B2 | 5/2010 | Kertz et al. | |

(Continued)

FOREIGN PATENT DOCUMENTS

| DE | 10 2007 054 066 A1 | 5/2008 |
| WO | WO 2012/096513 A2 | 7/2012 |

OTHER PUBLICATIONS

European Search Report for European Patent Application No. 14174823.6 issued Oct. 28, 2014, 8 pages.

*Primary Examiner* — Freddie Kirkland, III
(74) *Attorney, Agent, or Firm* — Foley & Lardner LLP

(57) ABSTRACT

An exhaust aftertreatment system includes an exhaust aftertreatment component housing and a sensor table coupled to an exterior surface of the exhaust aftertreatment component housing. The sensor table includes a base including footings and a first platform offset from the footings by first standoffs so to define a first air gap. The base also includes second standoffs extending from the first platform. The sensor table also includes a top plate including a second platform and third standoffs extending from the second platform. The second platform is fixedly coupled to the second standoffs so to define a second air gap between the first platform and the second platform. The sensor table further includes a first sensor module coupled to the third standoffs so to define a third air gap between the second platform and the first sensor module.

20 Claims, 11 Drawing Sheets

(51) Int. Cl.
*F01N 3/20* (2006.01)
*F01N 3/021* (2006.01)

(52) U.S. Cl.
CPC ....... *G01M 15/102* (2013.01); *F01N 2260/20* (2013.01); *F01N 2470/18* (2013.01); *Y02T 10/24* (2013.01)

(58) Field of Classification Search
USPC ...................................................... 73/114.75
See application file for complete search history.

(56) References Cited

U.S. PATENT DOCUMENTS

| | | | | |
|---|---|---|---|---|
| 7,966,979 | B2* | 6/2011 | Olsen | F01N 13/00 123/195 A |
| 9,217,355 | B2* | 12/2015 | Boahene | F01N 13/008 |
| 2007/0163765 | A1* | 7/2007 | Rondier | H01L 23/473 165/170 |
| 2008/0121451 | A1* | 5/2008 | Kertz | B60K 13/04 180/69.24 |
| 2010/0031644 | A1* | 2/2010 | Keane | B60K 13/04 60/295 |
| 2013/0145820 | A1 | 6/2013 | Boahene et al. | |
| 2014/0373721 | A1* | 12/2014 | Sandou | F01N 3/0211 96/421 |
| 2015/0059457 | A1* | 3/2015 | Niaz | F01N 3/2892 73/114.71 |

\* cited by examiner

EXHAUST AFTERTREATMENT SENSOR ASSEMBLY

CROSS-REFERENCE TO RELATED PATENT APPLICATIONS

This application claims the benefit of U.S. Provisional Patent Application No. 61/840,960, filed Jun. 28, 2013, entitled "EXHAUST AFTERTREATMENT SENSOR ASSEMBLY," which is incorporated herein by reference.

BACKGROUND

Exhaust aftertreatment systems receive and treat exhaust gas generated from an internal combustion (IC) engine. Typical exhaust aftertreatment systems include any of various components configured to reduce the level of harmful exhaust emissions present in the exhaust gas. For example, some exhaust aftertreatment systems for IC engines, such as diesel-powered IC engines, include various components, such as a diesel oxidation catalyst (DOC), particulate matter filter or diesel particulate filter (DPF), and a selective catalytic reduction (SCR) catalyst, among others. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

One or more exhaust aftertreatment components, such as the DOC, DPF, and SCR catalyst can be housed in a common housing in an end-to-end or end-to-side configuration. Exhaust aftertreatment components may be controlled based on detected operating conditions to facilitate optimal exhaust emissions treatment. Typically, the operating conditions include exhaust gas conditions that are detected by one or more sensors in fluid communication with the exhaust gas passing through the exhaust aftertreatment system. The sensors may be electrically coupled to one or more modules that process and transmit data associated with the signals received from the sensors. For example, a conventional exhaust aftertreatment system may include exhaust temperature sensors to detect the temperature of exhaust gas at various locations within the system, exhaust pressure sensors to detect the pressure of exhaust gas at various locations within the system, $NO_x$ sensors to detect the concentration of $NO_x$ in the exhaust gas at various locations within the system, and ammonia ($NH_3$) sensors to detect the concentration of ammonia in the exhaust gas at various locations within the system. The sensors and associated modules are commonly mounted onto an exterior of the housing that contains the exhaust aftertreatment components.

Conventional aftertreatment component sensors and modules are susceptible to degradation and failure due to exposure to excessive heat and vibration. Heat from the exhaust gas flowing through the exhaust aftertreatment components tends to transfer from the exhaust gas, through the housing, and into the sensors and modules via conduction and convention. Further, the sensors and modules may vibrate during operation of the engine due to vibrations induced by the engine and/or by a vehicle in which the engine is housed. Although some heat transfer and/or vibrations may be tolerable, excessive heat transfer and/or vibrations may result in fault codes, vehicle down time, and higher costs.

SUMMARY

One embodiment relates to an exhaust aftertreatment system. The exhaust aftertreatment system includes an exhaust aftertreatment component housing and a sensor table coupled to an exterior surface of the exhaust aftertreatment component housing. The sensor table includes a base including footings and a first platform offset from the footings by first standoffs so to define a first air gap. The base also includes second standoffs extending from the first platform. The sensor table also includes a top plate including a second platform and third standoffs extending from the second platform. The second platform is fixedly coupled to the second standoffs so to define a second air gap between the first platform and the second platform. The sensor table further includes a first sensor module coupled to the third standoffs so to define a third air gap between the second platform and the first sensor module.

Another embodiment relates to an exhaust aftertreatment system. The exhaust aftertreatment system includes a first exhaust aftertreatment component and a second exhaust aftertreatment component in fluid communication with the first exhaust aftertreatment component. The first and second exhaust aftertreatment components are arranged in a switchback configuration. The exhaust aftertreatment system also includes a first sensor table coupled to a housing of the first exhaust aftertreatment component via a remote mounting bracket. The remote mounting bracket is configured to provide a space between the first sensor table and the housing. The exhaust aftertreatment system further includes a first sensor assembly mounted to the first sensor table.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
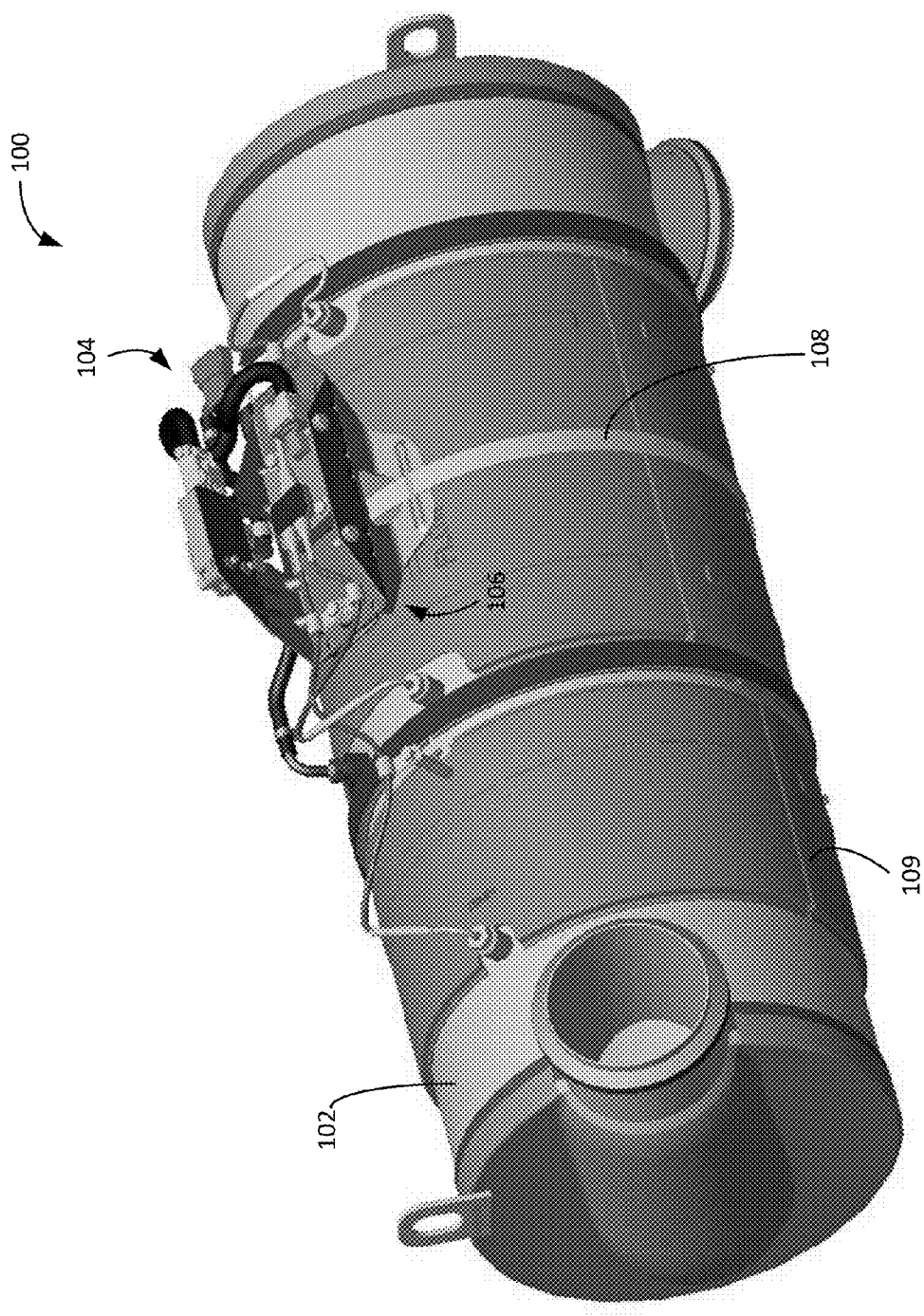
FIG. 1 illustrates an exhaust aftertreatment system according to an example embodiment.

The subject matter of the present application has been developed in response to the present state of the art and, in particular, in response to the problems and needs in the art that have not yet been fully solved by currently available exhaust aftertreatment systems employing exhaust condition sensors. Accordingly, the subject matter of the present application has been developed to provide an exhaust sensor assembly and associated apparatus that overcome at least some of the above-mentioned and below-mentioned shortcomings of prior art exhaust aftertreatment systems and exhaust condition sensing techniques and devices.

Reference throughout this specification to features, advantages, or similar language does not imply that all of the features and advantages that may be realized with the present disclosure should be or are in any single embodiment or implementation of the invention. Rather, language referring to the features and advantages is understood to mean that a specific feature, advantage, or characteristic described in connection with an embodiment is included in at least one embodiment of the present disclosure. Discussion of the features and advantages, and similar language, throughout this specification may, but do not necessarily, refer to the same embodiment or implementation.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

Certain types of vehicles, such as heavy-duty trucks powered by diesel engines, may operate both in transit and while stationary. For example, certain types of vehicles may spend a significant amount of operational time (e.g., up to 90%) with the engine running while the vehicle is stationary. For example, the engine may be running a generator to cool a refrigerated truck, to drive a pump on a fire engine, to power hydraulics for a crane or construction equipment, etc. Stationary applications often provide worst-case heat conditions due to the lack of cool ambient airflow.

The number of exhaust aftertreatment components utilized in diesel-powered vehicles has increased as increasingly stringent exhaust emissions requirements have been implemented. In addition, the amount of available space on vehicles to mount exhaust aftertreatment components is limited. Therefore, as manufacturers implement additional exhaust aftertreatment components, such components often must be arranged in close proximity to each other, and in close proximity to other vehicle components. As such, exhaust aftertreatment components are likely to receive heat from and to transfer heat to other vehicle components. Such heating, combined with the lack of cool ambient airflow in stationary applications, may cause dangerously hot operating conditions compared to conventional exhaust aftertreatment systems. Electronic components, such as sensor assemblies utilized with exhaust aftertreatment systems, may become damaged if exposed to excessive heat over time. Therefore, it is desirable to minimize heat transfer from vehicle components, such as exhaust aftertreatment components, to their corresponding sensor assemblies.

FIG. 1 illustrates an exhaust aftertreatment system 100 configured to reduce exhaust emissions from an IC engine (e.g., a diesel engine), according to an example embodiment. The exhaust aftertreatment system 100 includes a housing 102 in fluid (e.g., exhaust gas) communication with an IC engine. The exhaust aftertreatment system 100 includes a plurality of exhaust treatment devices or components retained within the housing 102. In an example embodiment, the exhaust aftertreatment system 100 includes a diesel particulate filter (DPF) retained within the housing 102. In another example embodiment, retained within the housing 102, the exhaust aftertreatment system 100 includes a diesel oxidation catalyst (DOC) and a DPF downstream of the DOC. In another example embodiment, the aftertreatment system 100 includes a selective catalytic reduction (SCR) catalyst retained within the housing 102 downstream of the DPF (see, e.g., FIG. 8). Although the exhaust aftertreatment system 100 of FIG. 1 includes one DOC and DPF in a specific order relative to each other, in other embodiments, exhaust aftertreatment systems can have fewer or additional exhaust aftertreatment devices, which may be in the same order of in a different order as those of the exhaust aftertreatment system 100 without departing from the essence of the present disclosure.

The exhaust aftertreatment system 100 also includes a sensor assembly 104 mounted on a two-part sensor table 106, which is coupled to the housing 102. As shown, the sensor table 106 is coupled to an exterior surface of the housing 102 via a band 108. In other example embodiments, the sensor table 106 is coupled to the housing 102 in other ways, such as by welding or otherwise fastening the sensor table 106 to the housing 102. In some example embodiments, the exhaust aftertreatment system 100 also includes an insulating cover 109 positioned on an exterior surface of the housing 102 to retain heat within the housing 102. In some embodiments including a cover 109, the sensor table 106 is mounted directly to the cover 109, which is attached to the housing 102. However, in other embodiments, the sensor table 106 is mounted directly to the housing 102 via openings in the cover 109.

According to various example embodiments and as explained in further detail below, the sensor table 106 includes various design features to minimize heat transfer and vibration to the sensor assembly 104. For example, the sensor table 106 in one embodiment includes various design features (e.g., standoffs) that define multiple air gaps to minimize heat transfer from the housing 102 to the sensor assembly 104 by providing air insulation layers and air flow channels therebetween. In addition, the overall shape of the sensor table 106 is optimized to minimize conductive heat transfer from the housing 102 to the sensor assembly 104. Further, the sensor table 106 includes ribs to provide improved structural strength, thereby optimizing resistance to vibration-induced stress and strain.

Figure 2:
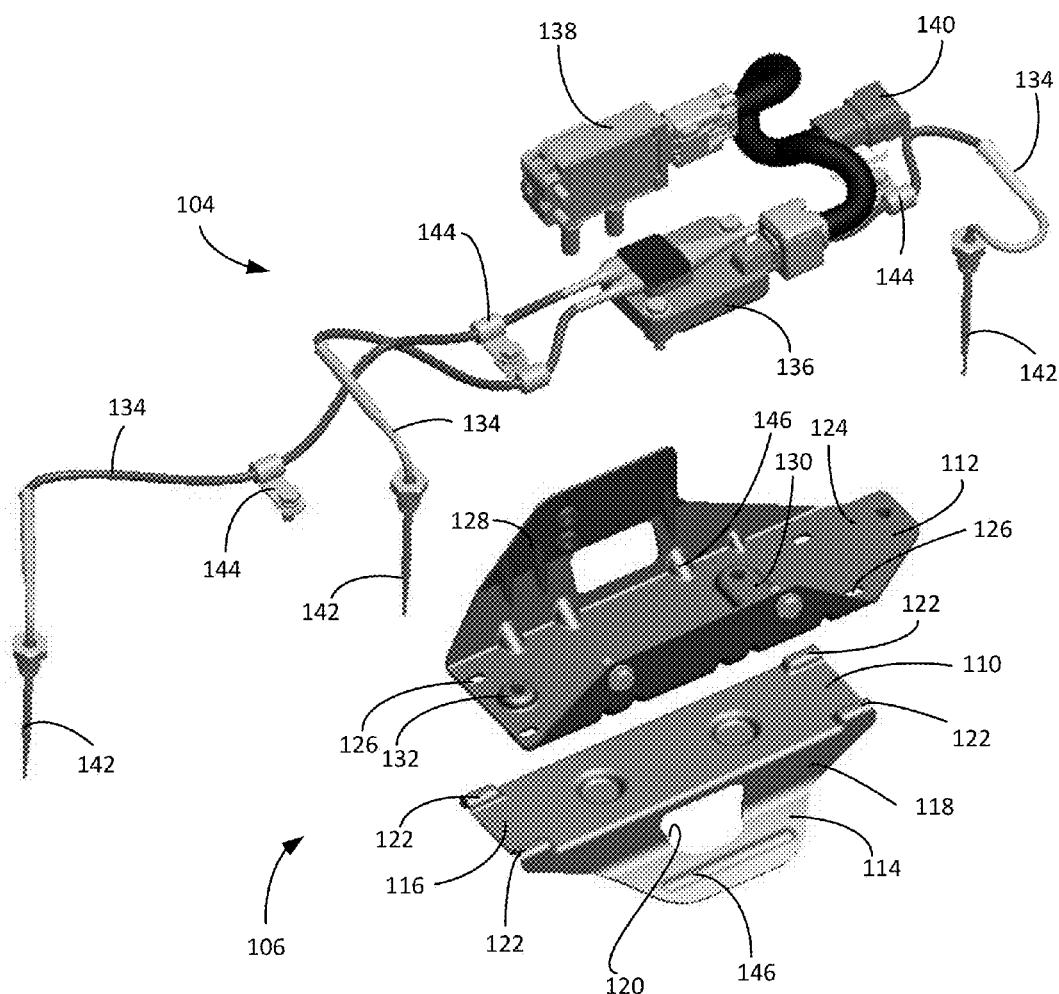
FIG. 2 is an exploded view of a sensor assembly and a sensor table of the exhaust aftertreatment system of FIG. 1.

FIG. 2 is an exploded view of the sensor assembly 104 and the sensor table 106 of FIG. 1. The sensor table 106 is a two-part structure including a base 110 and a top plate 112 fixedly coupled to the base via welding (e.g., spot welding), adhesion, fastening techniques, etc. In an example embodiment, each of the base 110 and the top plate 112 are formed of sheet metal, such as steel or aluminum, which is stamped and/or bent to form the geometry shown in FIG. 2. In other example embodiments, at least one of the base 110 and the top plate 112 are formed of various types of polymer materials, such as injection molded plastic.

The base 110 includes footings 114 that are configured to sit flush against an exterior of the housing 102 (FIG. 1). Accordingly, the footings 114 may have curved surfaces that match the curvature of the exterior surface of the housing 102. The footings 114 are coupled to a first platform 116 by first standoffs 118 that extend substantially perpendicular from the footings 114 (e.g., transversely relative to the footings 114) to offset the first platform 116 from the footings 114 and, accordingly, to offset the first platform 116 from the housing 102. The space by which the first platform 116 is offset from the housing 102 defines a first air gap, as discussed further in connection with FIG. 3B. Moreover, when retained against an exterior surface of the housing 102 or cover 109, the first air gap is further defined by the exterior surface of the housing 102 or cover 109, such that the first air gap becomes an air flow channel with substantially enclosed sides and open ends. According to an example embodiment, the base 110 is substantially symmetrical, such that the base 110 includes two footings 114. The footings 114 and the first standoffs 118 define first apertures 120 through which the band 108 of FIG. 1 may be threaded to secure the sensor table 106 to the housing 102. In the example embodiment as depicted in FIG. 2, tightening of the band 108 is the primary means of securely retaining the sensor assembly 104 on the housing 102.

The base 110 also includes a plurality of second standoffs 122 extending from the first platform 116. The second standoffs 122 may comprise elevated surfaces or protrusions that extend above the surface of the first platform 116. As shown in FIG. 2, the second standoffs 122 are positioned proximate the outer periphery of the first platform 116 and near the corners of the first platform 116.

The top plate 112 is fixedly coupled to the base 110 via welding (e.g., spot welding), adhesion, and/or other fastening techniques. The top plate 112 includes a second platform 124 that is secured to the second standoffs 122 of the base 110. The second standoffs 122 offset the second platform 124 from the first platform 116 so to define a second air gap, as discussed further in connection with FIG. 3B. The second air gap provides yet another air flow channel between the first and second platforms 116, 124 with substantially open sides and ends. In some embodiments, the second platform 124 includes second apertures 126 sized, shaped, and positioned to be alignable with the second standoffs 122. In an example embodiment, the top plate 112 is positioned on the base 110 such that the apertures 120 are aligned with the second standoffs 122, which are spot welded to the second platform 124 of the top plate 112 via the second apertures 126. In another example embodiment, fasteners extend through the second apertures 126 and through the second standoffs 122 to couple the top plate 112 to the base 110. According to an example embodiment, the second standoffs 122 are integral to the top plate 112 and are formed by stamping. In another example embodiment, the second standoffs 122 comprise discrete spacers that are not integrally formed with the top plate 112.

The top plate 112 also includes sidewalls 128 that extend substantially perpendicular relative to the second platform 124, such that the top plate 112 is generally U-shaped. In an example embodiment, one or more sensors are mounted to one or both of the sidewalls 128. Similar to the base 110, the top plate 112 includes third standoffs 130 extending from the second platform 124. The third standoffs 130 may be elevated regions or protrusions that extend above the surface of the second platform 124. In an example embodiment, as shown in FIG. 2, the third standoffs 130 can be positioned at a central location of the second platform 124. In another example embodiment, the third standoffs 130 can be located at any of various other locations on the second platform 124, such near an outer periphery of the second platform 124. The third standoffs 130 are configured to offset one or more sensors from the second platform 124 so to define a third air gap, as discussed further in connection with FIG. 3B. The top plate 112 may further include a fourth standoff 132 configured to offset sensor cables 134 (e.g., wires or leads) from the second platform 124.

The sensor assembly 104 includes the temperature sensor module 136 (e.g., an exhaust gas temperature sensor module), a pressure differential sensor module 138, and a delegated assembly harness 140 (e.g., customer connection harness). In an example embodiment, the third standoffs 130 are configured to receive and secure in place the temperature sensor module 136 of the sensor assembly 104. The temperature sensor module 130 may include a housing that contains software and/or hardware logic to receive, process, and transmit data related to the signals received by the various temperature sensors 142 of the sensor assembly 104. For example, the temperature sensor module 130 is electrically coupled to a plurality of exhaust temperature sensors 142 via the sensor cables 134, which themselves can be secured by couplings, such as P-clamps 144, elevated above the second platform 124 by the fourth standoffs 132. With the temperature sensor module 136 secured to the third standoffs, the temperature sensor module 136 is raised above or spaced apart from the second platform 124. In this manner, the third air gap is defined between the second platform 124 and the temperature sensor module 136. The third air gap provides another air flow channel between the second platform 124 and the temperature sensor module 136 with substantially open sides and ends.

One or more sensors may be mounted to the sidewalls 128 of the top plate 112. In an example embodiment, the pressure differential sensor module 138 is mounted to the one of the sidewalls 128. The pressure differential sensor module 138 may include a housing that contains software and/or hardware logic to receive, process, and transmit data related to the signals received by the various pressure sensors of the sensor assembly 104. For example, the pressure differential sensor module 138 may be mounted to the sidewall 128 via fasteners (e.g., bolts or screws), adhesives, or other fastening techniques. According to an example embodiment, the delegated assembly harness 140 is mounted to the top plate 112 via a clamp 144.

Each of the base 110 and the top plate 112 are designed to provide optimal resistance to vibration-induced stress and strain. The geometry of the base 110 and the top plate 112 are optimized through extensive finite element analysis (FEA) and component testing (e.g., vibration shaker table testing). Geometric discontinuities such as sharp corners can cause stress concentrations. However, designing parts to minimize geometric discontinuities typically involves increased material usage, thereby increasing material cost and part size. Therefore, the apertures and radii of each of the corners and edges of each of the base 110 and the top plate 112 are optimized with respect to the particular material thickness (e.g., sheet metal thickness) of the respective base 110 and top plate 112. Structural ribs 146 are also designed into each of the base 110 and the top plate 112. In particular, the size, shape, and quantity of the structural ribs 146 are optimized through FEA and component testing. For example, in an example embodiment, the top plate 112 includes a plurality of structural ribs 146 traversing the intersection between the second platform 124 and the sidewalls 128. The structural ribs 146 act to stabilize the sidewalls 128 relative to the second platform 124 such that relative movement between the sidewalls 128 and second platform 124 is reduced. Additionally structural ribs 146 may be included to couple two sections (e.g., an upper and lower section) of a single sidewall 128 as shown in FIG. 2. Similarly, the footings 114 of the base 110 include a structural ribs 154 that increase the rigidity of the footings 114, which results in a reduction in vibrations. In addition, the quantity and position of the coupling interfaces between the base 110 and the top plate 112 are optimized. For example, according to an example embodiment, four plug welds are used to couple the base 110 and the top plate 112.

Figure 3A:
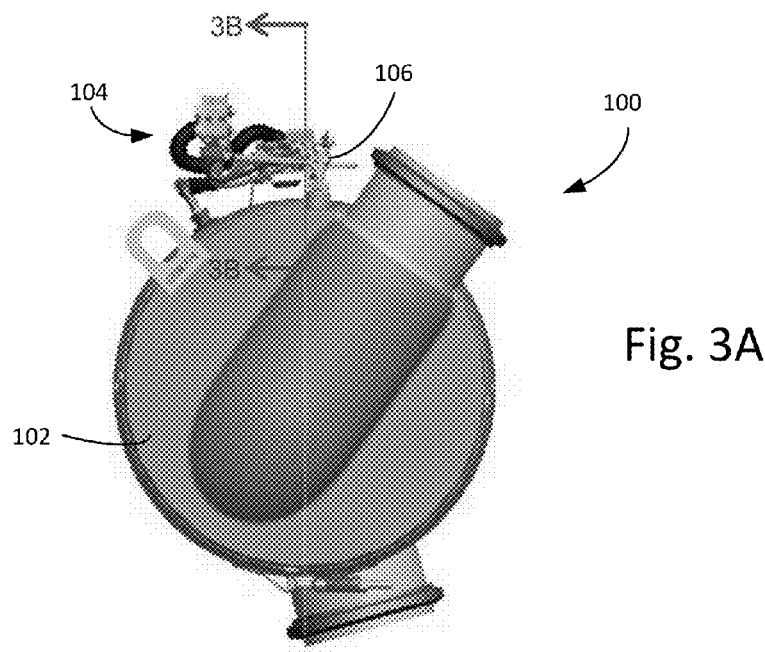
FIG. 3A is a front view of the exhaust aftertreatment system of FIG. 1.
Figure 3B:
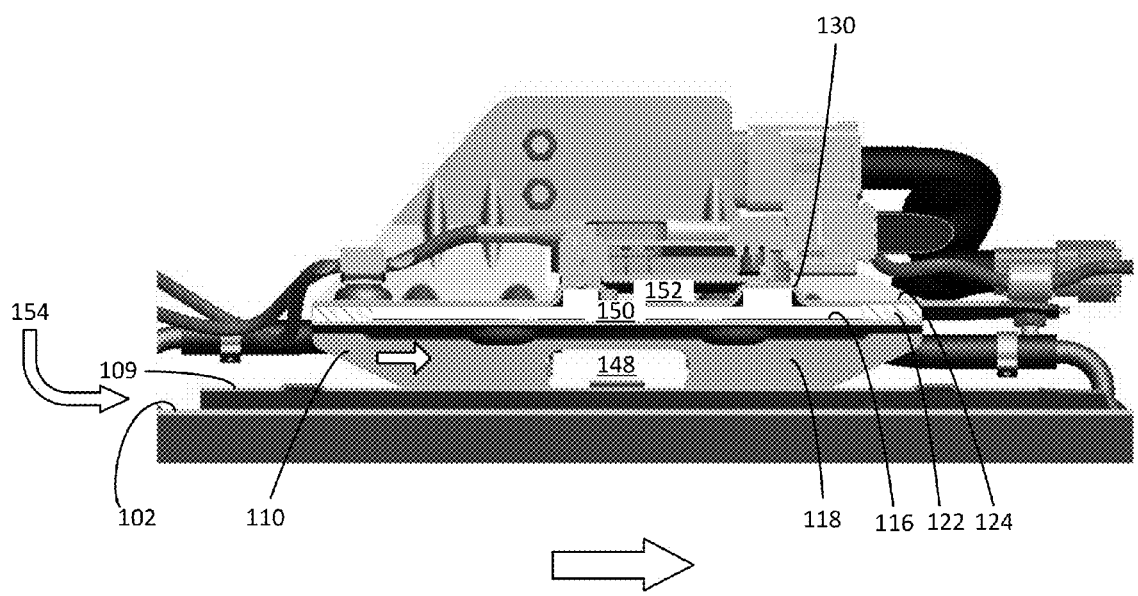
FIG. 3B is a sectional view of the exhaust aftertreatment system as illustrated in FIG. 3A, taken along line 3B-3B.

FIG. 3A is a front view of the exhaust aftertreatment system 100 of FIG. 1, including the housing 102 and the sensor assembly 104 mounted to the housing 102 via the sensor table 106. FIG. 3B is a sectional view of the exhaust aftertreatment system 100 of FIG. 3A, taken along line 3B-3B. As explained above in connection with FIG. 2, the base 110 may be coupled to the housing 102 over the cover 109. The first platform 116 of the base 110 is offset from the housing 102 (e.g., including the cover 109) via the standoffs 118, thereby defining a first air gap 148 between the first platform 116 and the housing 102. The second platform 124 of the top plate 112 is offset from the first platform 116 via the second standoffs 122, thereby defining a second air gap 150 between the first platform 116 and the second platform 124. The temperature sensor module 136 is offset from the second platform 124 via the third standoffs 130, thereby defining a third air gap 152 between the second platform 124 and the temperature sensor module 136. Temperature is typically hottest near the housing 102. Therefore, according to an example embodiment, the first air gap 148 is the largest of the first, second, and third air gaps 148, 150, 152 so as to facilitate a significant temperature reduction immediately adjacent the housing 102. Similarly, temperature is typically hotter at the second air gap 150 versus the third air gap 152. Therefore, according to an example embodiment, the second air gap 150 is larger than the third air gap 152.

The first, second, and third air gaps 148, 150, 152 facilitate the flow of ambient air 154 external to the housing 102, and between and around the housing 102, the first platform 116, the second platform 124, and the temperature sensor module 136. In operation, heat from exhaust gas flowing through the housing 102 is transferred to the housing 102. Heat from the housing 102 tends to transfer to the base 110 via conduction, as well as convection. Likewise, heat from the base 110 tends to transfer to the top plate 112 via conduction and convection. Similarly, heat from the top plate 112 tends to transfer to the temperature sensor module 136 via conduction and convection. Air located within the first, second, and third air gaps 148, 150, 152 acts as layers of insulation to reduce heat transfer between the housing 102, the base 110, the top plate 112, and the temperature sensor module 136. Further, because the temperature of ambient air is typically less than the temperature of each of the housing 102, the base 110, the top plate 112, and the temperature sensor module 136 during operation, ambient air flow through the first, second, and third air gaps 148, 150, 152 facilitates heat transfer from each of the housing 102, the base 110, the top plate 112, and the temperature sensor module 136 to the moving air via convection. The heated air then flows back into the environment where the heat is dissipated. In this manner, the first, second, and third air gaps 148, 150, 152 reduce heat transfer from the exhaust gas and the housing 102 to each of the base 110, the top plate 112, and the temperature sensor module 136, and increase the heat transfer away from each of the base 110, the top plate 112, and the temperature sensor module 136. Additionally, the relative large flat surface area of each of the first and second platforms 116, 124 promotes conductive and convective heat transfer away from the base 110 and top plate 112, and thereby the sensor modules, and into the ambient air flow 154.

The overall reduction in heat transfer to each of the temperature sensor module 136, the pressure differential sensor module 138, and the delegated assembly harness 140, by virtue of less heat transfer to the top plate 112, improves the operating lifecycle of the sensor assembly 104 and the associated sensors, thereby reducing fault codes, vehicle down time, and operating cost. Further, the configuration of the sensor assembly 104 promotes easy access to the delegated assembly harness 140.

Figure 4:
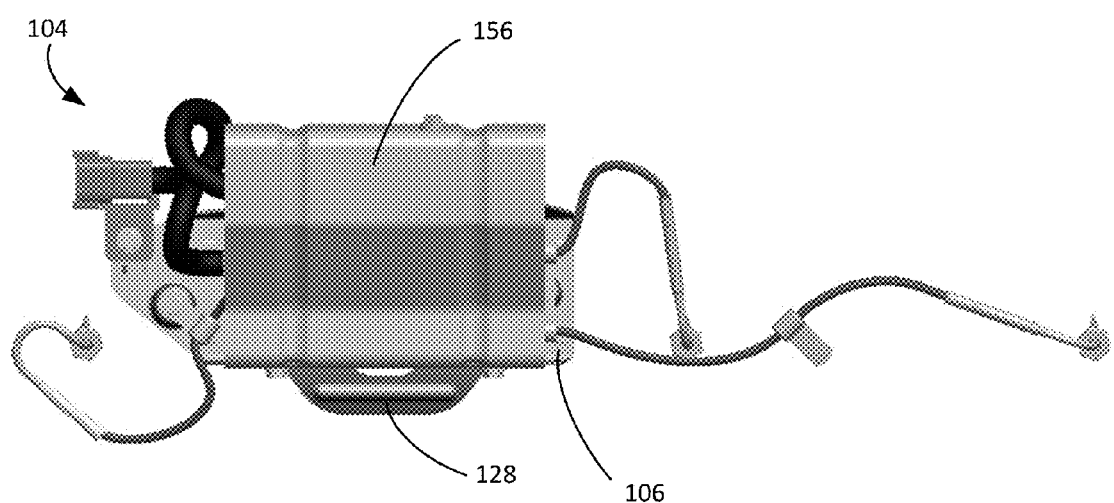
FIG. 4 is a top view of a sensor assembly and a sensor table of the exhaust aftertreatment system of FIGS. 1-3B.

FIG. 4 is a top view of the sensor assembly 104 and the sensor table 106 of FIGS. 1-3B. In some embodiments, such as the example embodiment illustrated in FIG. 4, a heat shield 156 is secured to the sidewalls 128 of the top plate 112 to further minimize heat transfer to the sensor assembly 104. In some embodiments, the heat shield 156 may be utilized in applications in which an external heat source is positioned near the sensor assembly 104. In addition to insulating the sensor assembly 104 from heat, the heat shield 156 also protects the sensor assembly 104 from debris.

Figure 5:
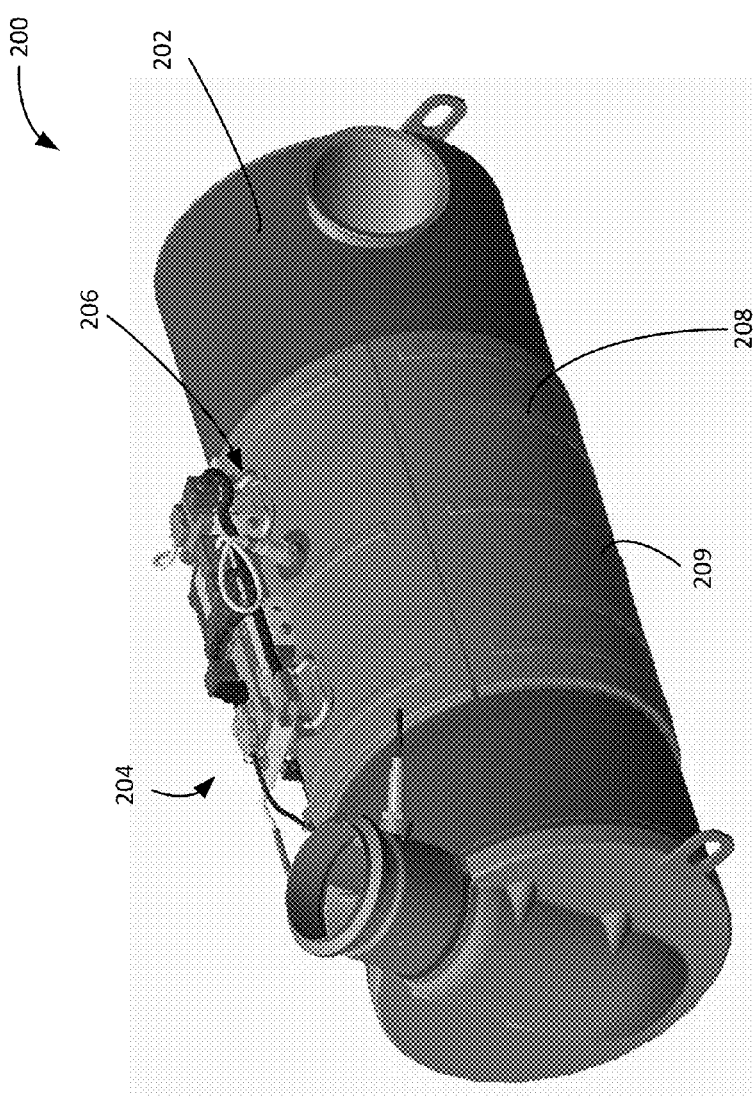
FIG. 5 illustrates an exhaust aftertreatment system according to another example embodiment.

FIG. 5 illustrates an exhaust aftertreatment system 200 according to another example embodiment. Generally, the exhaust aftertreatment system 200 is similar to the exhaust aftertreatment system 100 of FIGS. 1-4. Similar to the exhaust aftertreatment system 100, the exhaust aftertreatment system 200 includes a housing 202 and a sensor assembly 204 mounted on a two-part sensor table 206, which is coupled to the housing 202. However, according to an example embodiment, the housing 202 of the exhaust aftertreatment system 200 is configured to receive and house an SCR catalyst, whereas the housing 102 of the exhaust aftertreatment system 100 of FIGS. 1-4 is configured to house a DPF and/or a DOC. Accordingly, the sensor assembly 204 includes sensors and sensor modules associated with operation of an SCR catalyst. The sensor table 206 is coupled to the external surface of the housing 202 via bands 208. However, in other example embodiments, the sensor table 206 is coupled to the external surface of the housing 202 via welds, fasteners, or other fastening techniques. In some example embodiments, an insulating cover 209 is positioned on the external surface of the housing 202.

Figure 6:
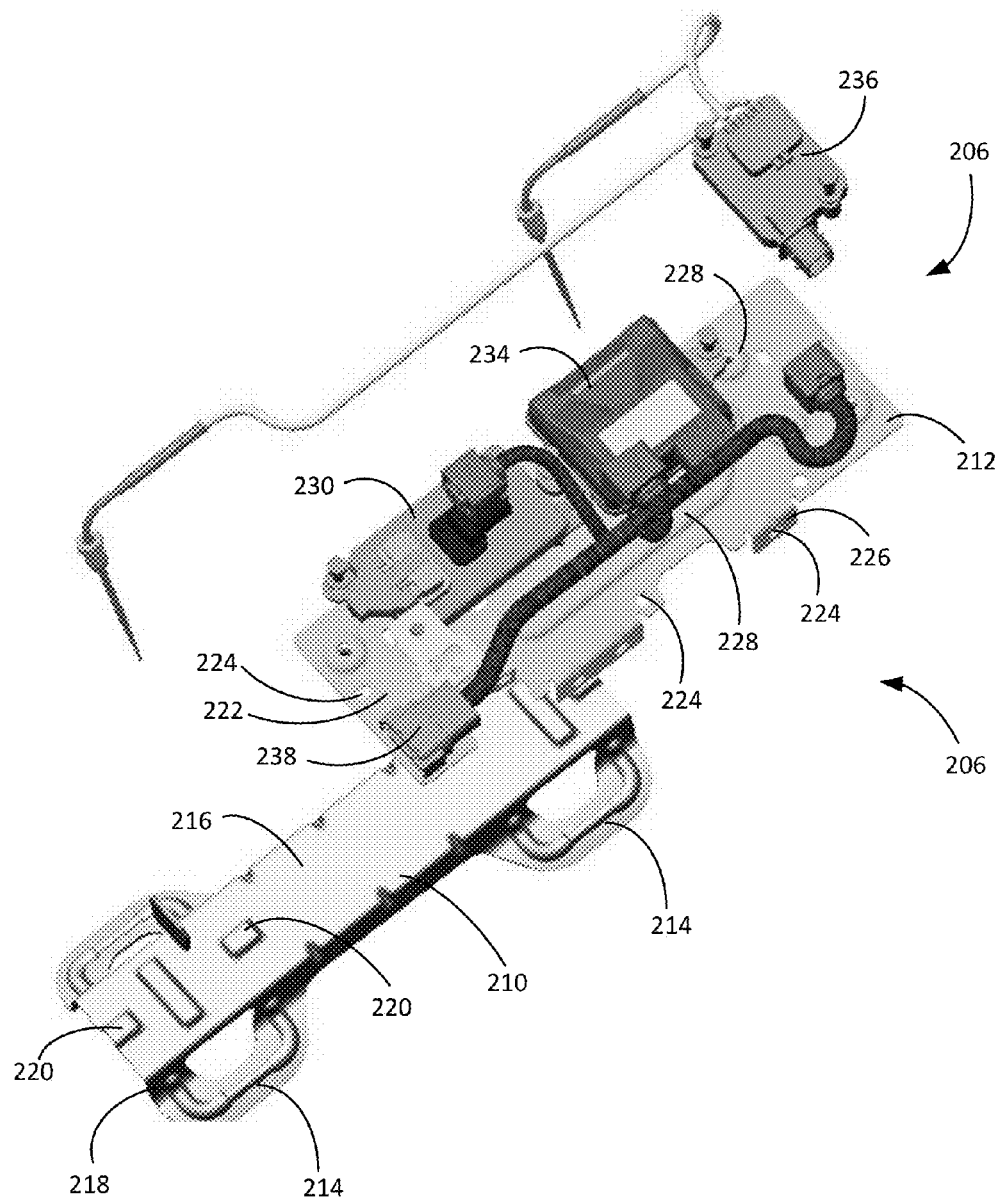
FIG. 6 is an exploded view of a sensor assembly and a sensor table of the exhaust aftertreatment system of FIG. 5.

FIG. 6 is an exploded view of the sensor assembly 204 and the sensor table 206 of FIG. 5. The sensor table 206 is a two-part structure including a base 210 and a top plate 212 fixedly coupled to the base via welding (e.g., spot welding), adhesion, fastening techniques, etc. In an example embodiment, each of the base 210 and the top plate 212 are formed of sheet metal, such as steel or aluminum, which is stamped and/or bent to form the geometry shown in FIG. 6. In other example embodiments, at least one of the base 210 and the top plate 212 are formed of various types of polymer materials, such as injection molded plastic.

The base 210 and the top plate 212 are elongated relative to the base 110 and top plate 112 of FIGS. 1-4 to accommodate the additional SCR-related components of the sensor assembly 204. The base 210, due to its elongation, includes two pairs of footings 214 coupled to the housing 202 via respective bands 208. The footings 214 are coupled to a first platform 216 by first standoffs 218 that extend substantially perpendicular from the footings 214 to offset the first platform 216 from the footings 214 and, accordingly, to offset the first platform 216 from the housing 202. The space by which the first platform 216 is offset from the housing 202 defines a first air gap. The base 210 also includes a plurality of second standoffs 220 extending from the first platform 216. The second standoffs 220 may comprise elevated surfaces or protrusions that extend above the surface of the first platform 216.

The top plate 212 is fixedly coupled to the base 210 via welding (e.g., spot welding), adhesion, and/or other fastening techniques. The top plate 212 includes a second platform 222 that is secured to the second standoffs 220 of the base 210. The second standoffs 220 offset the second platform 222 from the first platform 216 so to define a second air gap. In some embodiments, the second platform 222 includes second apertures 224 to facilitate coupling of the top plate 212 to the base 210, for example, via spot welding. According to an example embodiment, the top plate 212 also includes brackets 226 that are bent to extend substantially perpendicular from the second platform 222 to abut the first standoffs 218 of the base 210. The brackets 226 may also include second apertures 224 to facilitate coupling of the top plate 212 to the base 210. The top plate 212 also includes third standoffs 228 extending from the second platform 222. The third standoffs 228 are configured to offset one or more sensors from the second platform 222 so to define a third air gap. The sensor assembly 204 includes a $NO_x$ sensor module 230, a mid-bed $NH_3$ sensor module 232, a temperature sensor module 234 (e.g., an exhaust gas temperature sensor module), and a delegated assembly harness 236 (e.g., customer connection harness).

Figure 7A:
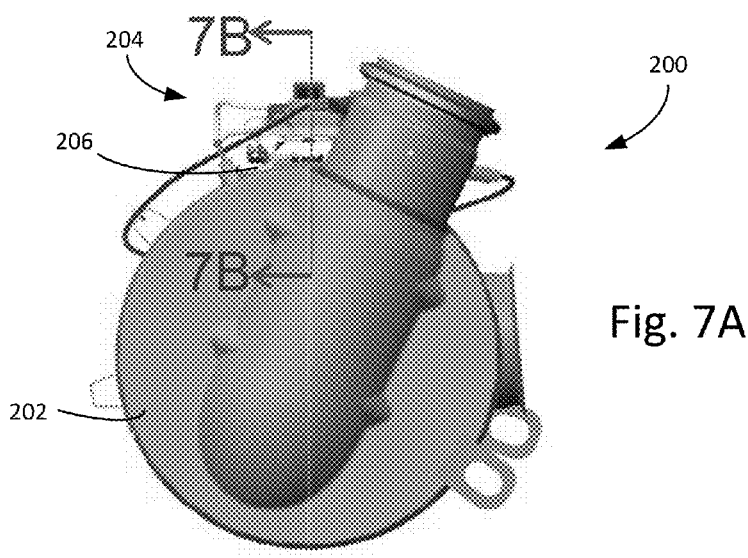
FIG. 7A is a front view of the exhaust aftertreatment system 200 of FIG. 6.
Figure 7B:
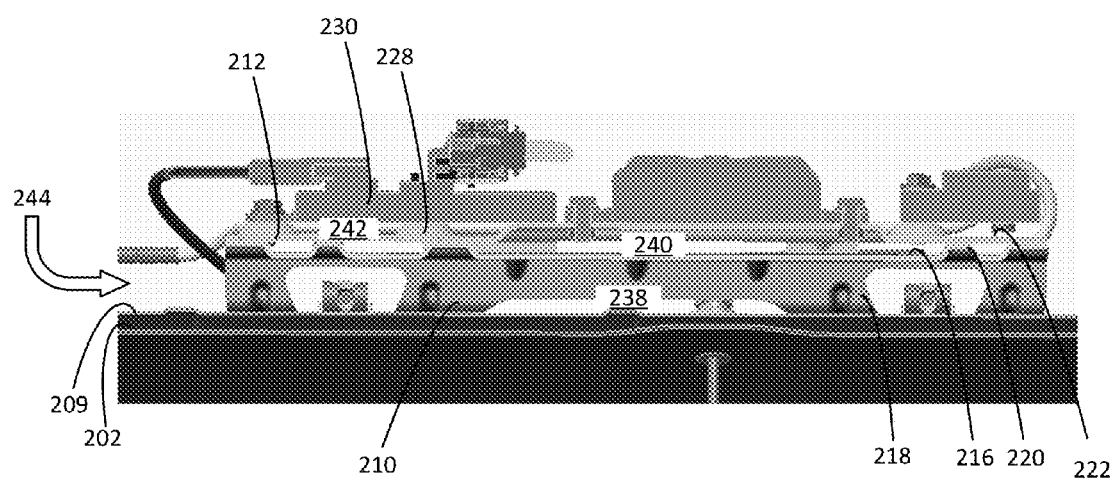
FIG. 7B is a sectional view of the exhaust aftertreatment system as illustrated in FIG. 7A, taken along line 7B-7B.

FIG. 7A is a front view of the exhaust aftertreatment system 200 of FIG. 6, including the housing 202 and the sensor assembly 204 mounted to the housing 202 via the sensor table 206. FIG. 7B is a sectional view of the exhaust aftertreatment system 200 of FIG. 7A, taken along line 7B-7B. The first platform 216 of the base 210 is offset from the housing 202 (e.g., including the cover 209) via the standoffs 218, thereby defining a first air gap 238 between the first platform 216 and the housing 202. The second platform 222 of the top plate 212 is offset from the first platform 216 via the second standoffs 220, thereby defining a second air gap 240 between the first platform 216 and the second platform 222. The $NO_x$ sensor module 230, for example, is offset from the second platform 222 via the third standoffs 228, thereby defining a third air gap 242 between the second platform 222 and the $NO_x$ sensor module 230.

As with the sensor assembly 104 and the sensor table 106 of FIGS. 1-4, the first, second, and third air gaps 238, 240, 242 reduce heat transfer from the housing 202 to each of the base 210, the top plate 212, and the sensor assembly 204. Further, the first, second, and third air gaps 238, 240, 242 increase the heat transfer away from each of the base 210, the top plate 212, and the sensor assembly 204. Additionally, the relatively large flat surface area of the first and second platforms 216, 222 promotes conductive heat transfer away from the base 210 and the top plate 212, and thereby away from the sensor assembly 204.

Figure 8:
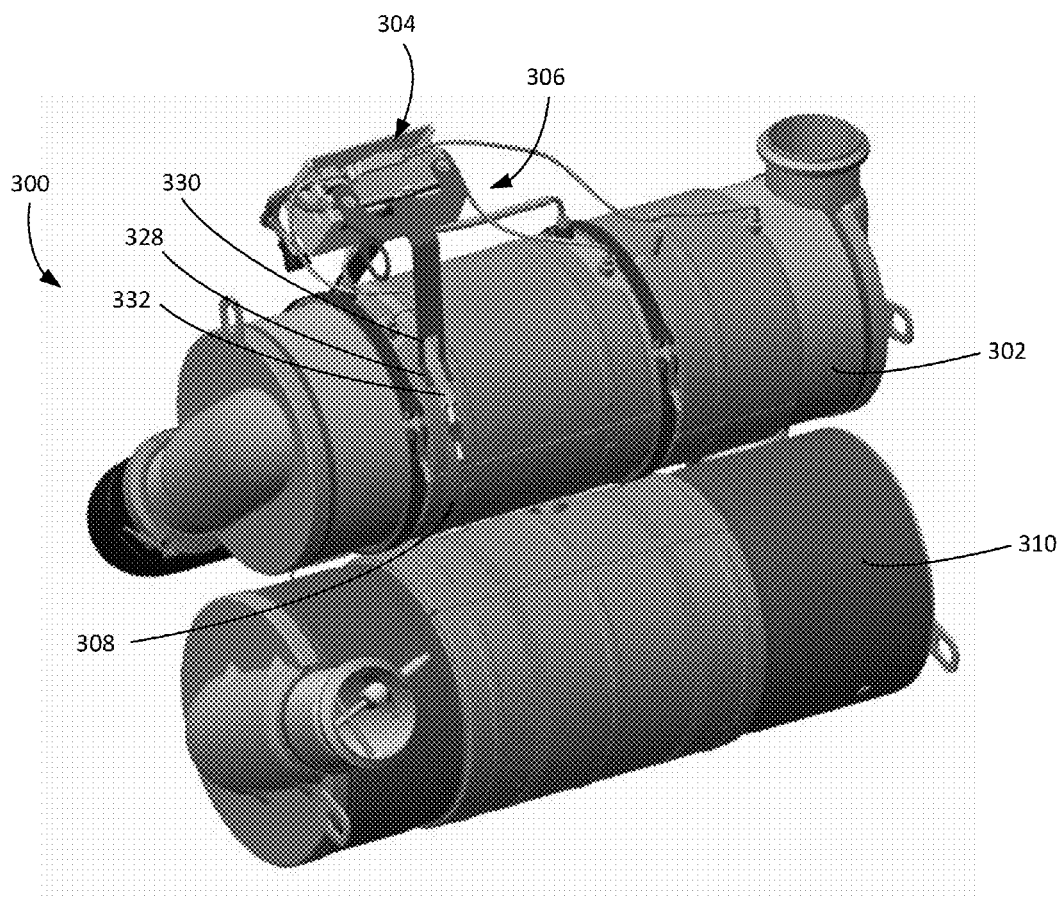
FIG. 8 illustrates an exhaust aftertreatment system according to another example embodiment.

FIG. 8 illustrates an exhaust aftertreatment system 300 according to another example embodiment. Generally, the exhaust aftertreatment system 300 is similar to the exhaust aftertreatment systems 100 and 200 of FIGS. 1-7B. The exhaust aftertreatment system 300 includes a first housing 302 and a first sensor assembly 304 mounted on a remote-mount sensor table 306, which is coupled to the first housing 302 via a band 308. The exhaust aftertreatment system 300 also includes a second housing 310 in fluid communication with the first housing 302 and positioned substantially below the first housing 302. For the purposes of this disclosure, relative terms such as "above," are used herein with respect to the position of components as they are depicted in the figures and/or as they would be mounted in a vehicle, which is in accordance with common usage by those of ordinary skill in the art. In an example embodiment, the first housing 302 includes a DPF and/or a DOC and the second housing 310 includes an SCR catalyst. The configuration of the exhaust aftertreatment system 300 may be referred to as a "switchback configuration" because after flowing in a first direction through the first housing 302, the exhaust gas is routed in a second direction through a conduit coupling the first and second housings 302, 310, where the exhaust gas subsequently flows in the first direction through the second housing 310.

Figure 9B:
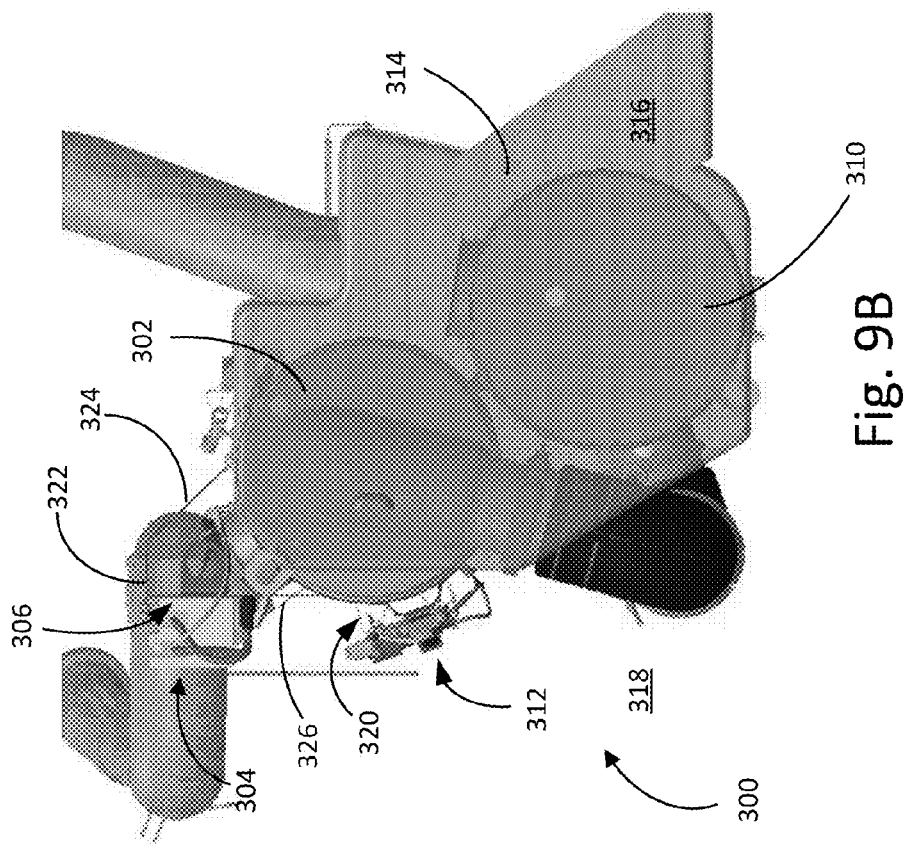
FIG. 9B illustrates a mounting configuration of the exhaust aftertreatment system of FIG. 8.
Figure 9A:
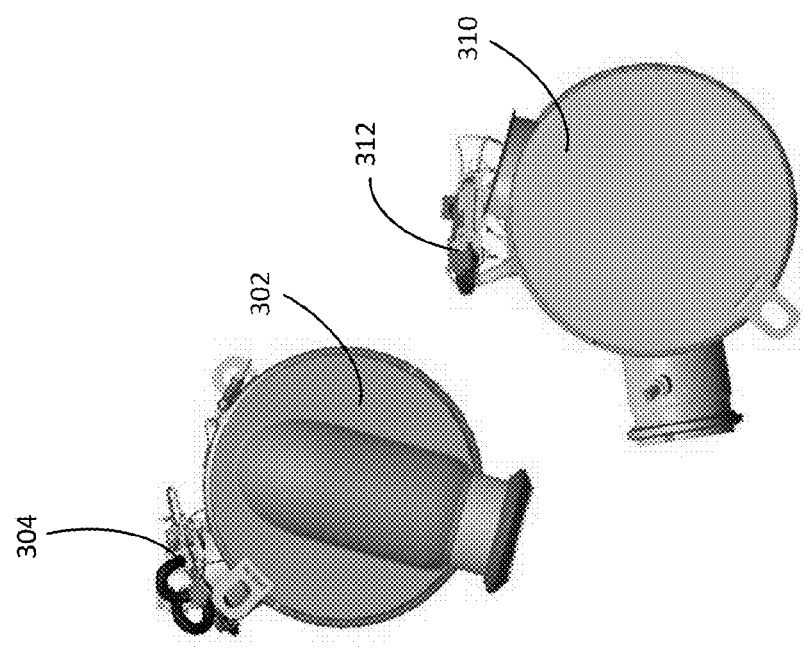
FIG. 9A illustrates conventional mounting configurations for sensor assemblies mounted to exhaust aftertreatment component housings.

FIG. 9A illustrates conventional mounting configurations for components of exhaust aftertreatment systems similar to the exhaust aftertreatment system 300 of FIG. 8. According to an example embodiment, the first sensor assembly 304 is mounted to the first housing 302 and a second sensor assembly 312 is mounted to the second housing 310. The first sensor assembly 304 is a DPF sensor assembly and the first housing 302 includes a DPF, and the second sensor assembly 312 is an SCR sensor assembly and the second housing 310 includes an SCR catalyst.

FIG. 9B illustrates the mounting configuration of the exhaust aftertreatment system 300 of FIG. 8, according to an example embodiment. In an example embodiment, the first housing 302 including a DPF and/or a DOC is positioned substantially above the second housing 310 including an SCR catalyst. As shown in FIG. 9B, the first and second housings 302, 310 are mounted in a switchback configuration within a step box 314. Such a space may have poor airflow characteristics, especially during stationary operations (e.g., power generation), which may lead to excessive heat buildup. In particular, a first side 316 of the exhaust aftertreatment system 300 is generally enclosed by the step box 314, whereas a second side 318 of the step box 314 is generally open, or at least more open than the first side 316. Because of the enclosed space and poor airflow of the first side 316, more heat tends to build up on the first side 316 as compared to the second side 318. Therefore, in an example embodiment, the second sensor assembly 312 is mounted on the first housing 302 so as to be proximate the second side 318 rather than on the second housing 310, and the first sensor assembly 304 is mounted further from the first housing 302 via the remote-mount sensor table 306. The remote-mount sensor table 306 is configured to increase the space between the first sensor assembly 304 and the first housing 302. The increase in space effectively increases the amount of insulation provided by the air between the first sensor assembly 304 and the first housing 302, thereby decreasing heat transfer from the first housing 302 to the first sensor assembly 304. The second sensor assembly 312 is mounted to the first housing 302 via a second sensor table 320. In an example embodiment, the second sensor table 320 is the same as or similar to the sensor table 206 of FIGS. 5-7B.

The remote-mount sensor table 306 is mounted to the first housing 302 via a remote mounting bracket 322. The remote mounting bracket 322 includes two spaced-apart legs 324, 326 that diverge away from the first sensor assembly 304 towards the first housing 302. In other words, the legs 324, 326 generally form a V-shape. As shown in FIG. 8, each of the legs 324, 326 includes a footing 328 that sits flush against the first housing 302, and an aperture 330 formed proximate the footing 328. A band 332 extends through the apertures 330 in the legs 324, 326. The band 332 can be tightened against the footings 328 to securely retain the remote mounting bracket 322, and therefore the remote-mount sensor table 306, to an exterior of the first housing 302. The legs 324, 326 are shaped and sized such that when securely coupled to the first housing 302, the first sensor assembly 304 is spaced away from the exterior of the first housing 302 by a desired distance. In an example embodiment, the desired distance is between about 0.5 and 1.5 times a radius of the first housing 302.

Figure 10:
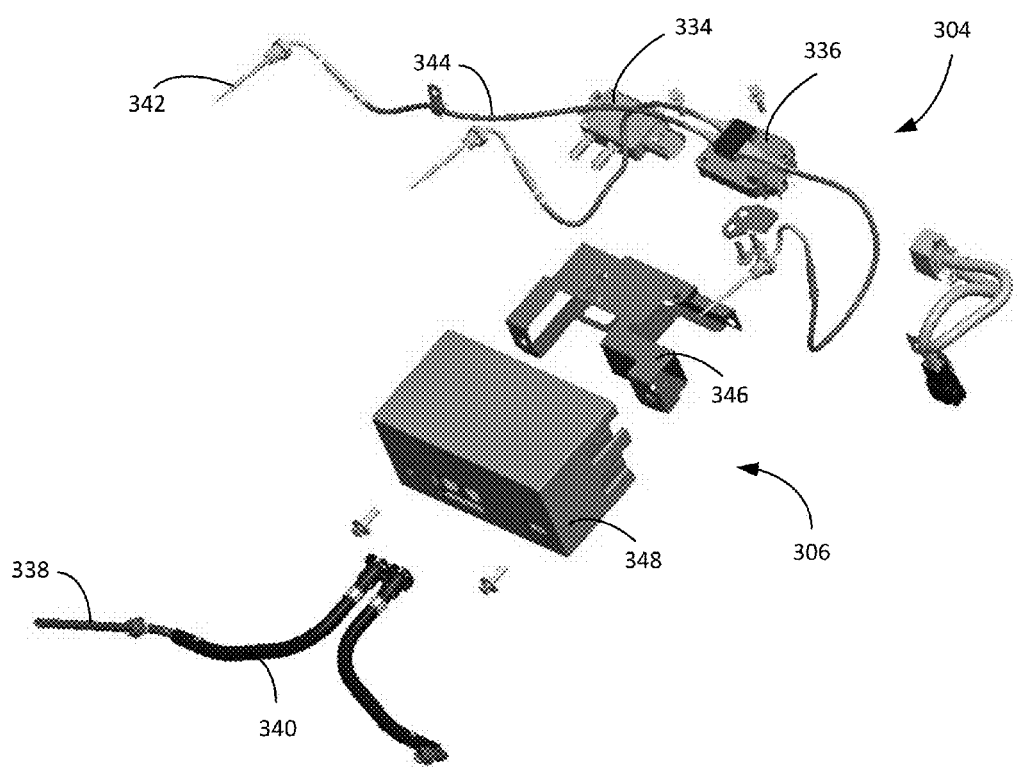
FIG. 10 is an exploded view of a sensor assembly and a remote-mount sensor table of the exhaust aftertreatment system of FIGS. 8 and 9B.

FIG. 10 is an exploded view of the first sensor assembly 304 and the remote-mount sensor table 306 of FIGS. 8 and 9B. The first sensor assembly 304 includes a pressure differential sensor module 334 and a temperature sensor module 336. The pressure differential sensor module 334 is operably coupled to pressure sensor probes 338 via first cables 340 and is configured to measure pressure levels of the exhaust gas within the first housing 302. In particular, the pressure differential sensor module 334 is configured to measure a pressure drop across an exhaust aftertreatment component (e.g., a DPF) within the first housing 302. The temperature sensor module 336 is operably coupled to temperature probes 342 via second cables 344 and is configured to measure temperature levels of the exhaust gas within the first housing 302. Each of the pressure differential sensor module 334 and the temperature sensor module 336 is mounted to the sensor mounting bracket 346. The sensor mounting bracket 346 is mounted within a heat shield 348. The heat shield 348 provides additional protection against heat transfer from the first housing 302 and the surrounding components, and further protects the first sensor assembly 304 from debris. The heat shield 348 is mounted on the remote mounting bracket 322 to complete the remote-mount sensor table 306, thereby mounting the first sensor assembly 304 to the first housing 302.

Figure 11B:
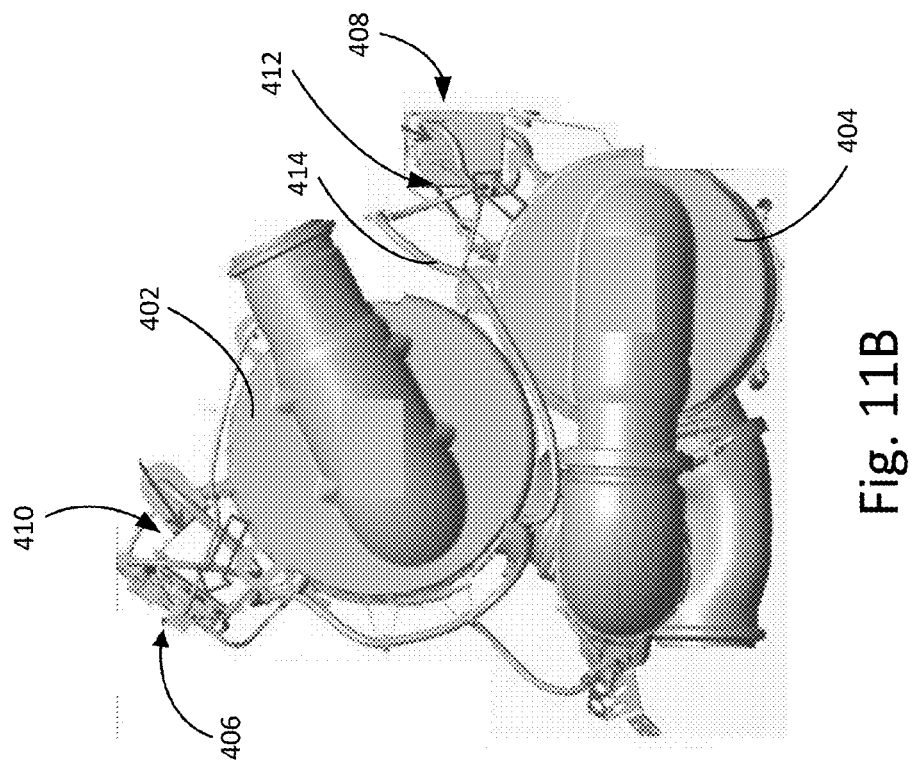
FIG. 11B illustrates an alternative mounting configuration for the first and second sensor assemblies of FIG. 11A, according to an example embodiment.
Figure 11A:
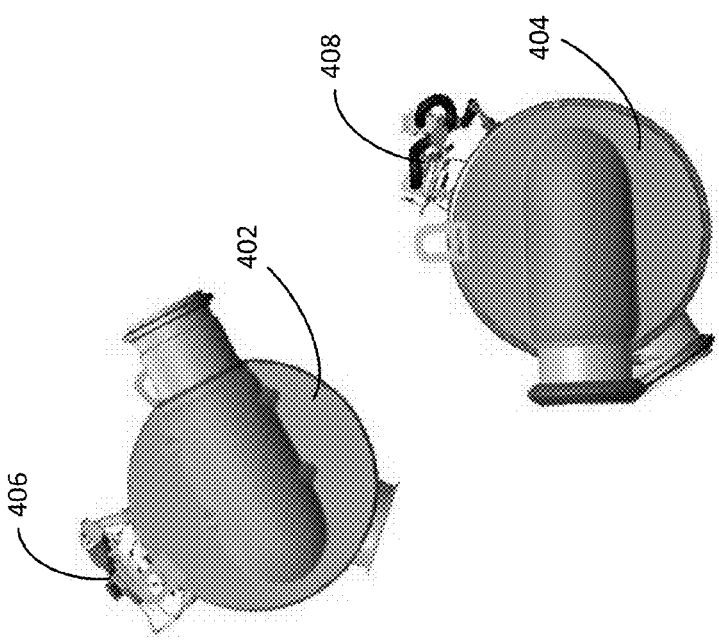
FIG. 11A illustrates another conventional mounting configuration for exhaust aftertreatment components and corresponding sensor assemblies.

FIG. 11A illustrates another conventional mounting configuration for exhaust aftertreatment components and corresponding sensor assemblies. Certain Original Equipment Manufacturers (OEMs) may position exhaust aftertreatment components in different configurations. For example, as shown in the configuration of FIG. 11A, a first housing 402 including an SCR catalyst is positioned substantially above a second housing 404 including a DPF and/or a DOC. A first sensor assembly 406 is mounted on the first housing 402 and a second sensor assembly 408 is mounted on the second housing 404. However, heat from each of the first and second housings 402, 404 and from the surrounding components may be transferred to the first and second sensor assemblies 406, 408, which may induce thermal stress-related failures.

FIG. 11B illustrates an alternative mounting configuration for the first and second sensor assemblies 406, 408 of FIG. 11A. In the example embodiment shown in FIG. 11B, the first sensor assembly 406 is mounted to the first housing 402 via a first remote-mount sensor table 410, and the second sensor assembly 408 is mounted to the second housing 404 via a second remote-mount sensor table 412 coupled to a remote mounting bracket 414. Each of the first and the second remote-mount sensor tables 410, 412 are configured to provide additional space between the respective first and second sensor assemblies 406, 408 to minimize heat transfer to the respective sensor assemblies. According to an example embodiment, the first sensor assembly 406 is an SCR sensor assembly and the first housing 402 includes an SCR catalyst. In addition, the second sensor assembly 408 is a DPF sensor assembly and the second housing 404 includes a DPF.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. An exhaust aftertreatment system, comprising:
   an exhaust aftertreatment component housing; and
   a sensor table coupled to an exterior surface of the exhaust aftertreatment component housing, the sensor table comprising:
   a base including footings and a first platform offset from the footings by first standoffs so to define a first air gap, the base further including second standoffs extending from the first platform,
   a top plate including a second platform and third standoffs extending from the second platform, the second platform fixedly coupled to the second standoffs so to define a second air gap between the first platform and the second platform, the top plate further includes sidewalls extending substantially perpendicular relative to the second platform, the sidewalls configured to support at least one sensor, and
   a first sensor module coupled to the third standoffs so to define a third air gap between the second platform and the first sensor module.

2. The exhaust aftertreatment system of claim 1, wherein the top plate defines a plurality of apertures spaced so as to align with the second standoffs.

3. The exhaust aftertreatment system of claim 2, wherein the second standoffs are spot welded to the top plate via the plurality of apertures.

4. The exhaust aftertreatment system of claim 1, wherein at least one of the base and the top plate comprises stamped sheet metal.

5. The exhaust aftertreatment system of 1, wherein the top plate further comprises a fourth standoff extending from the second platform, the fourth standoff configured to elevate a sensor cable from the second platform, the sensor cable operably coupling the first sensor module and a first sensor.

6. The exhaust aftertreatment system of claim 5, wherein the sensor cable is coupled to the fourth standoff via a P-clamp.

7. The exhaust aftertreatment system of claim 1, wherein the footings and the first standoffs define apertures configured to receive a band to couple the sensor table to the exhaust aftertreatment component housing.

8. The exhaust aftertreatment system of claim 1, wherein each of the base and the top plate further include structural ribs.

9. The exhaust aftertreatment system of claim 1, wherein the exhaust aftertreatment component includes at least one of a diesel particulate filter and a diesel oxidation catalyst.

10. The exhaust aftertreatment system of claim 1, further comprising a heat shield coupled to the sidewalls of the top plate.

11. The exhaust aftertreatment system of claim 1, wherein the exhaust aftertreatment component includes a selective catalytic reduction (SCR) catalyst.

12. The exhaust aftertreatment system of claim 1, wherein the first air gap is larger than each of the second and third air gaps.

13. The exhaust aftertreatment system of claim 12, wherein the second air gap is larger than the third air gap.

14. An exhaust aftertreatment system, comprising:
a first exhaust aftertreatment component;
a second exhaust aftertreatment component in fluid communication with the first exhaust aftertreatment component, the first and second exhaust aftertreatment components arranged in a switch-back configuration;
a first sensor table coupled to a housing of the first exhaust aftertreatment component via a remote mounting bracket, wherein the remote mounting bracket is configured to provide a space between the first sensor table and the housing, the remote mounting bracket including two spaced-apart legs, each of the two spaced-apart legs having a footing and an aperture formed proximate to the footing;
a first sensor assembly mounted to the first sensor table; and
a band extending through the aperture of each of the two spaced-apart legs to couple the remote mounting bracket to the first exhaust aftertreatment components.

15. The exhaust aftertreatment system of claim 14, wherein the space is between 0.5 and 1.5 times a radius of the housing.

16. The exhaust aftertreatment system of claim 14, wherein the first sensor table includes a sensor mounting bracket and a heat shield, the first sensor assembly mounted to the sensor mounting bracket and the sensor mounting bracket mounted within the heat shield, the heat shield mounted on the remote mounting bracket.

17. The exhaust aftertreatment system of claim 16, wherein the first exhaust aftertreatment component is positioned substantially above the second exhaust aftertreatment component, and wherein the first exhaust aftertreatment component includes a DPF and the second exhaust aftertreatment component includes an SCR catalyst.

18. The exhaust aftertreatment system of claim 17, further comprising a second sensor assembly mounted to a second sensor table, the second sensor table coupled to the first exhaust aftertreatment component.

19. The exhaust aftertreatment system of claim 16, wherein the second exhaust aftertreatment component is positioned substantially above the first exhaust aftertreatment component, wherein the first exhaust aftertreatment component includes a DPF and the second exhaust aftertreatment component includes an SCR catalyst.

20. The exhaust aftertreatment system of claim 19, further comprising a second sensor assembly mounted to a second sensor table, the second sensor table coupled to the second exhaust aftertreatment component.

* * * * *